Feb. 25, 1930.　　W. C. STEWART ET AL　　1,748,684
OIL RETAINING MEANS FOR GEAR CASINGS
Filed Feb. 2, 1929　　4 Sheets-Sheet 3
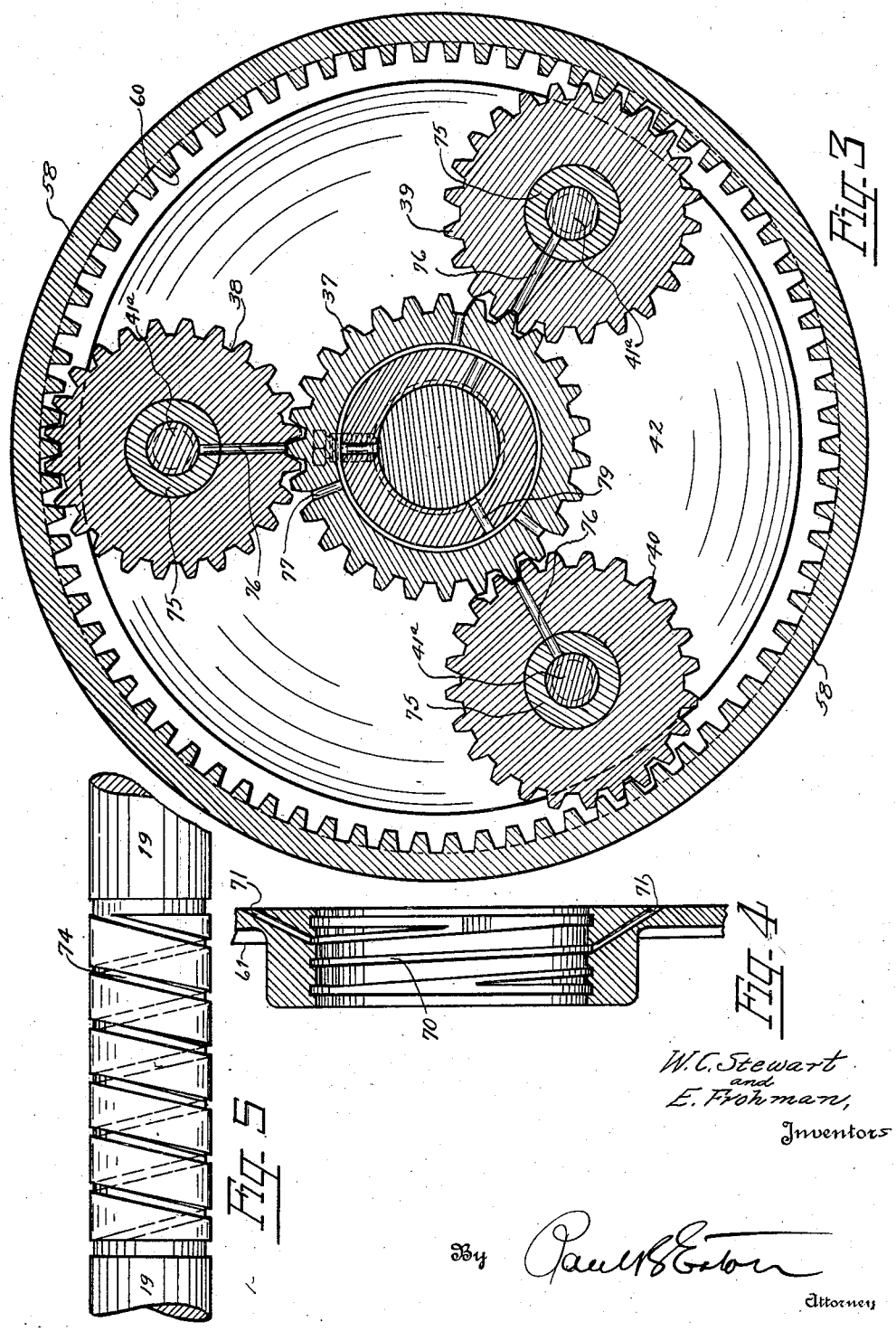
W. C. Stewart
and
E. Frohman,
Inventors
By Paul B. Eaton
Attorney

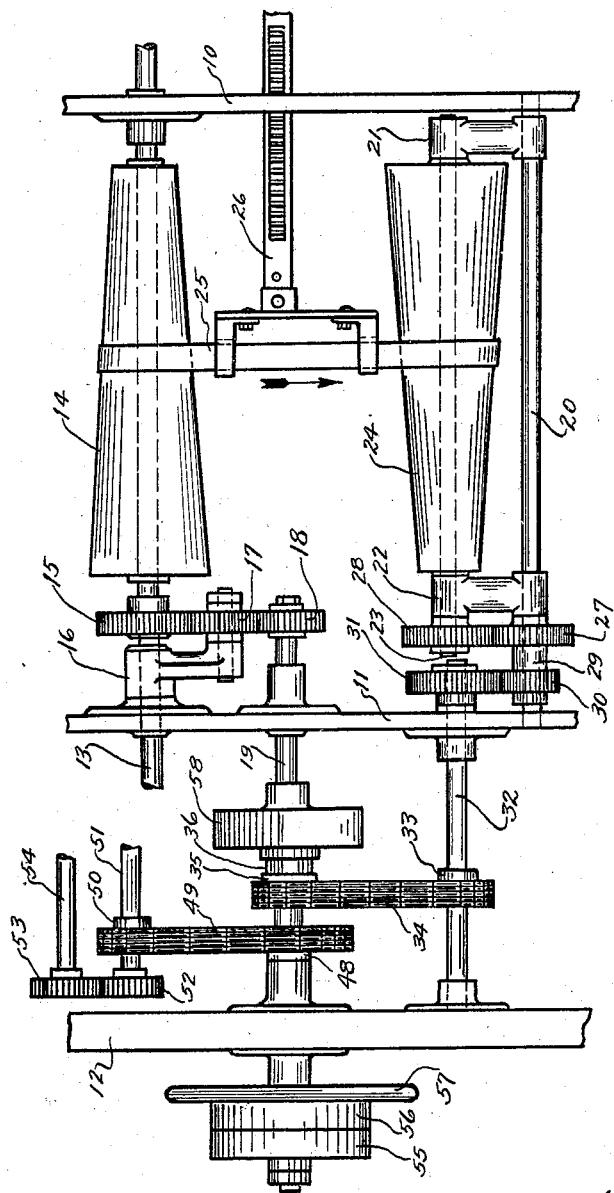

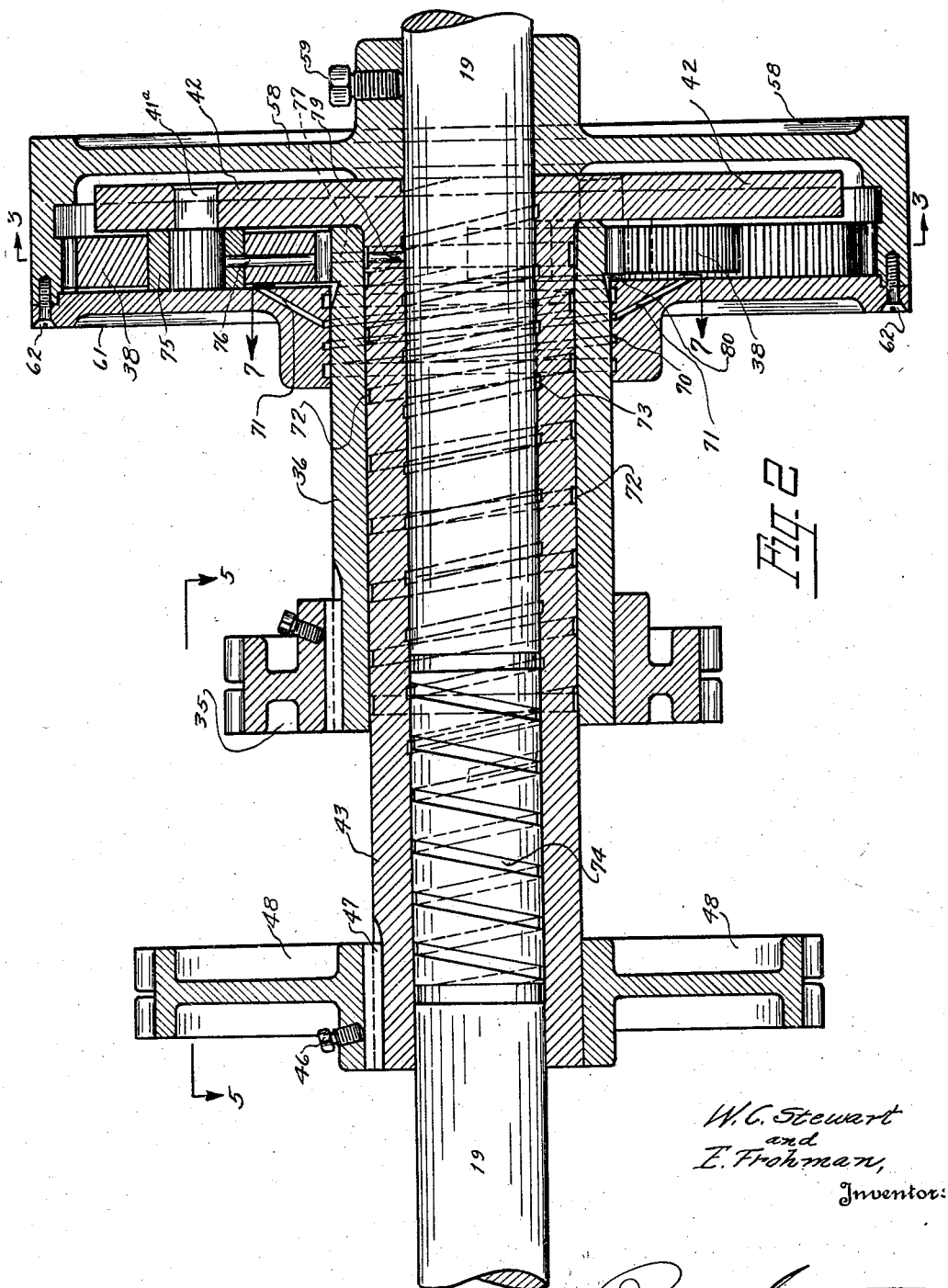

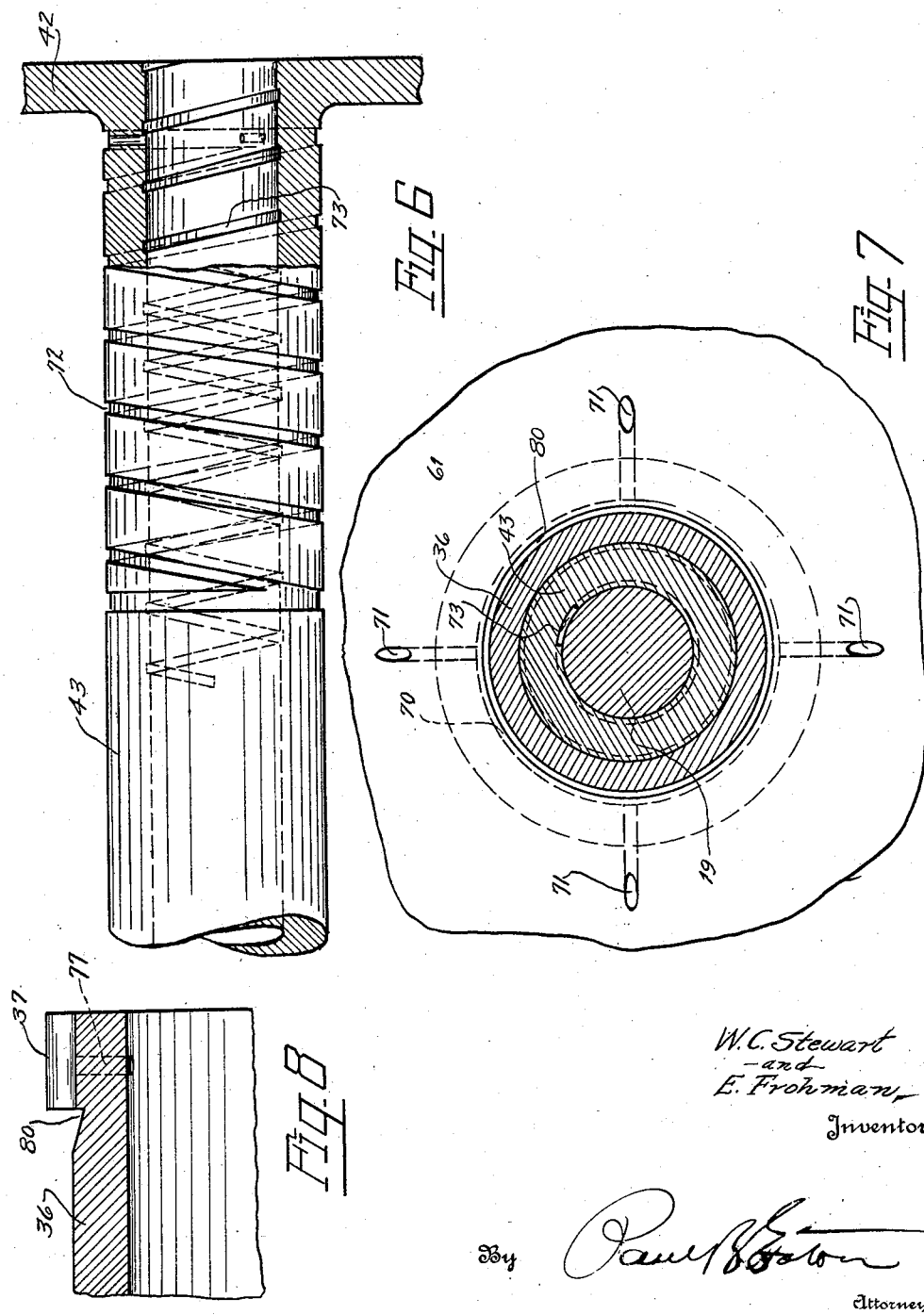

Patented Feb. 25, 1930

1,748,684

UNITED STATES PATENT OFFICE

WALTER C. STEWART AND EMANUEL FROHMAN, OF GASTONIA, NORTH CAROLINA; SAID STEWART ASSIGNOR TO SAID FROHMAN

OIL-RETAINING MEANS FOR GEAR CASINGS

Application filed February 2, 1929. Serial No. 337,160.

This invention relates to a differential unit for roving frames, spinning frames and the like, in which means are provided for working in co-operation with the driving mechanism for the roving frame and varying the speed of the bobbin shafts, together with means for retaining the oil and lubricating material which is contained by the differential unit.

An object of our invention is to provide a differential motion for roving frames by means of which the desired speed may be imparted to the bobbin shafts with the minimum amount of loss in energy in accomplishing this result, and at the same time retaining the lubricant within the differential casing and allowing a thin lubricant to be used which will not escape from the differential housing.

Another object of our invention is to provide a differential motion for roving frames in which all of the moving parts move in the same direction at different speeds so as to procure the proper speed for the bobbin shafts with the minimum amount of power being wasted in attaining this result, together with means for lubricating the various parts of the machine, and retaining the lubricant within the differential housing while the same is being operated.

This application is a continuation in part of the application of one of the inventors therein, namely, W. C. Stewart, said application being Serial Number 295,036, filed July 24, 1928.

Another object of our invention is to provide a gear housing having means for retaining lubricant therein, regardless of the type of lubricant used.

Another object of our invention is to provide a gear casing which will allow air to escape therefrom but which will prevent escape of the lubricant contained in the casing.

Some of the objects of our invention having been stated, other objects will appear as the description proceeds when taken in connection with the accompanying drawings, in which—

Figure 1 is a side elevation of a portion of a roving frame showing our invention applied thereto;

Figure 2 is a longitudinal cross-sectional view;

Figure 3 is a cross-sectional view taken along the line 3—3 in Figure 2;

Figure 4 is an enlarged cross-sectional view of the central portion of the cover for the casing;

Figure 5 is a view of the portion of the drive-shaft between the point 5—5 in Fig. 2;

Figure 6 is an enlarged side elevation partly in cross-section, showing one of the sleeves;

Figure 7 is a cross-sectional view taken along the line 7—7 in Figure 2;

Figure 8 is a cross-sectional view of a portion of sleeve 36.

Referring more particularly to the drawings, the numeral 10 indicates the second samson of a roving frame, while the numeral 11 indicates the first samson of a roving frame, and the numeral 12 indicates the head of the frame, and in the first and second samsons is mounted the shaft 13 on which the cone pulley 14 is mounted and also mounted on the shaft is the gear wheel 15, and pivotally mounted on the shaft is the arm 16 which has the gear wheel 17 mounted thereon, which gear wheel meshes with the gear wheel 15 and also the gear wheel 18 on the main drive shaft 19.

In the lower portion of the first and second samsons 10 and 11 is fixedly mounted the shaft 20, which has the pivoted arms 21 and 22 mounted thereon, and in the ends of these arms is rotatably mounted the shaft 23 which has the cone pulley 24 mounted thereon, and running between the cone pulleys 14 and 24 is the cone belt 25 which has the cone belt rack or shifter 26 in engagement therewith for the purpose of guiding said belt on the cone pulleys. The shaft 20 has mounted thereon the gear 27 which gear engages the gear 28 fixedly mounted on the shaft 23, the gear 27 being integral with the sleeve 29 and on this sleeve 29 is mounted the gear 30, which gear engages the gear 31 fixedly mounted on the shaft 32. It might be stated that the parts thus far described are the conventional parts of a roving frame, in addition to some other parts hereinafter described, our invention as applied to roving frames being more specifically shown in Figures 2 to 7.

Fixedly mounted on the shaft 32 is the gear wheel 33 which is adapted to receive the chain belt 34, which chain belt 34 is also mounted on the gear 35 which is fixedly mounted on the sleeve 36 in the differential, and this sleeve 36 has the gear teeth 37 integral therewith adapted to engage the pinions 38, 39 and 40, which pinions are mounted on the studs 41$^a$ which are fixedly secured to the disk 42, this disk 42 being integral with the sleeve 43. Fixedly mounted on the sleeve 43 by means of the set screw 46 and the slot and wedge means 47 is the gear wheel 48 which has the chain belt 49 mounted thereon, which chain belt is also mounted on the gear wheel 50 which is fixedly mounted on one of the bobbin shafts 51, said bobbin shaft having gear 52 thereon which is adapted to mesh with the gear 53 which is fixedly mounted on the other bobbin shaft 54. These bobbin shafts in Figure 1 are shown in elevated position, their proper position being immediately behind the roving frame differential, but they are lifted up for the sake of clearness.

The main drive shaft 19 has mounted thereon the loose pulley 55 and the tight pulley 56, which has integral therewith the hand wheel 57. This shaft 19 has fixedly mounted thereon the housing 58 by means of the set screw 59, said housing having the internal gear 60 around its entire periphery, which gear is adapted to engage the pinions 38, 39 and 40 which are mounted on the disk 42. The plate 61 is adapted to be secured to the housing 58 by means of the screws 62 and this plate 61 is adapted to fit around the sleeve 36.

We have found that in a structure as described where the drive shaft and sleeve 43 and the sleeve 36 are all moving in the same direction that a lubricant placed within the gear casing formed by the members 58 and 61 will gradually creep out between the space between these members, and even though a thick grease is used this soon becomes emulsified, and is pushed out between the sleeve member and the drive-shaft. We have devised means whereby instead of the lubricant escaping from the gear casing that it will be retained in said gear casing due to certain features which we shall presently describe.

The hub portion of the member 61 has the spiral groove 70 therein, which normally tends to feed the lubricant back into the gear casing. This member 61 has the four slanting holes designated by the reference character 71 which is more clearly shown in Figures 2 and 7, which leads from the interior of the gear casing downwardly into the groove 70 or in close proximity to this groove, and causes the oil to be sent down through this into the groove, which groove will feed the same back into the gear casing. The sleeve 43 has the spiral groove 72 on the outside thereof which forces any lubricant which may tend to escape between the sleeves 36 and 43 back into the gear casing. This sleeve 43 also has the spiral groove 73 on the inside thereof, which forces the lubricant which may tend to escape between the inside of the sleeve and the drive shaft back into the gear casing. The drive shaft 19 has the spiral groove 74 therein which laps over the spiral groove on the inside of the sleeve 43, and these two grooves working together forces the lubricant back into the gear casing and keeps any lubricant from escaping from the end of the sleeve 43. The pinions 38, 39 and 40 have the bushings 75 therein, and the hole 76 is drilled through the pinion and bushing for the purpose of lubricating the bearing between the bushing 75 and the pin 41$^a$. The sleeve 36 has the holes 77 drilled in the geared portion 37 which causes the lubricant to be forced through said hole by the action of the pinions 38, 39 and 40, and these holes are adapted to coincide with the hole 79 in the sleeve 43, which will force the oil into engagement with the drive shaft, and the groove 74 on the drive shaft will deliver the lubricant back into the gear casing formed by the members 58 and 61.

With the arrangement described all parts of the mechanism will be thoroughly lubricated, and by using the grooves as illustrated and described it is possible to use a very light lubricant within the gear casing, and yet prevent escape of the lubricant from the gear casing. Of course, it is evident that a slight amount of refuse or burnt-up oil may escape but this can be easily disposed of, without the dripping thereof off of the machinery onto other objects. It is a well known fact that with these gears working within the gear casing that the lubricant becomes emulsified and will be forced out of the casing unless some means are provided, and in the co-pending application of W. C. Stewart, which has been above referred to the grooves were missing and it has been the experience of the applicants that a great quantity of lubricant has been forced out between the sleeves and the drive shaft, and the grooves herein illustrated and described were devised to prevent the escape of this lubricant, which purpose they perform very efficiently.

The sleeve 36 has the groove 80 in close proximity to the gear teeth 37, into which the oil is fed by the grooves 70 in the member 61 and from this the oil flows in between the gear teeth 37, where it is forced through the holes 77 and 79 in the sleeves 36 and 43. While we have shown our oil retaining arrangement applied to a differential for roving frames and the like, we desire it to be understood that it may be applied to any gear housing in which the oil is desired to be retained in the housing without escaping therefrom, it being evident that this feature may be applied to a great number of uses in oil retaining devices for gear casings.

The clearance between the sleeves 36 and 43, and the sleeve 36 and the hub portion of 61, and between the sleeve 43 and the drive shaft 19 is close enough to allow the air to escape from the casing thru the grooves, but these grooves feed the lubricant back into the casing. It is evident that when the casing has a lubricant added thereto and the parts set in motion that the lubricant will be emulsified to some extent and the temperature of the lubricant will rise due to friction of parts, and this will cause the air to expand and escape from the casing, and were it not for the grooves, the lubricant would be forced out of the casing also.

While the member 58 is making one complete revolution, and if the sleeve and gearwheel 36 are held stationary the disk 42 and 48 mounted thereon which are both mounted on the sleeve 43 makes seventy-four one hundredths of a revolution. While the sleeve 36 makes one complete revolution and the casing 58 being held stationary the disk 42 which carries the pinions thereon makes twenty-six one hundredths of a revolution. On the ordinary roving frame differential using bevel gears in a epicyclic train the cone acting through shaft 32 and the pinion running from a bevel gear such as is located at 33 and meshing into a large sun wheel in the roving frame differential, the large sun wheel is driven in the opposite direction to the direction of rotation of the driving member which is a bevel gear in the old roving frame instead of the housing 58 as shown in our invention. In this invention cone acting through shaft 32, sprocket 33, chain 34 and sprocket 35 on sleeve 36 rotates sleeve 36, on which is mounted the gear 37, in the same direction as the main housing 58 rotates the gear 60 made integral therewith, as the main housing 58 is secured to the drive shaft 19. This causes the pinions 38, 39 and 40 to be rotated around their own centers and around the axis of the drive shaft, moving pinions 41ª, disk 42 sleeve 43, sprocket wheel 48 in the same direction as the driving parts are moving. In other words all rotating members of the applicants' invention moves in the same direction, which means a great saving in horsepower on account of a minimum amount of friction being developed. Furthermore, applicants' mechanism can be turned by hand while the same is disconnected from a machine and motor, while in the old type of roving frame differential having the bevel gears they are locked in position and cannot be moved except by great force from a prime mover. A further test of the saving of power in the two types of differentials is proven by the fact that when the power is taken away from the old type of differential it will stop almost immediately while in the new type as shown in applicants' invention the whole mechanism will continue to move after power is removed, which operates on the principle of a fly-wheel and allows the momentum to be extended, which in itself proves that the friction of applicants' structure to a great degree less than in the old structure heretofore used.

In the drawings and specification we have set forth a preferred embodiment of our invention, and although specific terms are employed, they are used in a generic and descriptive sense only, and not for purposes of limitation, the scope of the invention being set forth in the appended claims:

We claim:

1. In a differential unit for roving frames and the like, a driving shaft, a sealed housing having an internal gear fixedly mounted on the driving shaft, a sleeve mounted directly on the driving shaft for rotation thereon and having a disk secured thereto, a plurality of pinions mounted for rotation on the disk and being adapted to engage the said internal gear, a second sleeve mounted for rotation on the first named sleeve and having a gear wheel thereon adapted to engage the said pinions, spiral grooves on said driving shaft, the interior of the first named sleeve, the exterior of the first named sleeve, and the interior of the cover, all of said spiral grooves being adapted to feed the lubricant back into the casing and to allow air to escape therefrom.

2. In a differential unit for roving frames and the like, comprising a driving shaft, a sealed housing member having an internal gear therein and being fixedly mounted on the driving shaft, a sleeve rotatably mounted directly on the driving shaft and having a gear fixedly mounted thereon, a second sleeve mounted on the first named sleeve and having a disk integral thereon, said disk being entirely within the sealed housing and enclosed thereby, said disk also having a plurality of pinions mounted thereon adapted to engage the internal gear and also to engage the gear on the said sleeve, spiral grooves on the exterior of the driving shaft and the exterior of the first named sleeve and also on the interior of the first named sleeve and the interior of the hole in the sealed housing through which the second named sleeve projects all of said grooves being adapted to feed oil back into the casing and to allow air to escape therefrom.

3. In a differential motion for roving frames and the like, a main drive shaft, a housing member having an internal gear secured on the main drive shaft, a cover for said housing member fixedly mounted thereon, a sleeve rotatably mounted on the main drive shaft and having a portion thereof extending into the member having the internal gear, a disk secured to said sleeve, said disk being sealed in the casing, a plurality of pinions secured on the disk and being adapted to mesh with the internal gears on the said housing member, a second sleeve member rotatably mounted on the first named sleeve member and having a gear thereon adapted to mesh with the said pinions, a gear wheel mounted on the first named sleeve, and a gear wheel mounted on the second named sleeve, and spiral grooves located on the exterior of the drive shaft and the first sleeve and on the interior of the cover for said housing member, all of said spiral grooves being adapted to feed lubricant back into the casing to prevent escape of the same therefrom and to allow air to escape through said grooves.

4. In a roving frame and the like having a main drive shaft, a hollow circular casing fixedly secured on the drive shaft, and having a bottom member integral therewith, a cover member fixedly secured on the casing, a hole in said cover member, an internal gear on the periphery of said casing, a sleeve rotatably mounted directly on the drive shaft and having a major portion thereof on the outside of the casing with one of its ends projecting into the casing, a disk fixedly mounted on the end of the said sleeve in the housing, pinions on said disk adapted to mesh with the said internal gear, a gear wheel on the exterior end of said sleeve, a second sleeve rotatably mounted on the said first sleeve and having one end thereof projecting through the hole in said cover into the casing forming a close fit in said hole, and having a spur gear on the other end within the casing, which spur gear is adapted to mesh with said pinions, and a gear mounted on the portion of said second sleeve outside of the casing, and spiral grooves between said sleeves and said drive shaft adapted to feed lubricant back into the casing to prevent the escape thereof from the casing and to allow air bubbles to escape therefrom.

5. In a differential motion, a casing, a cover for said casing, a drive shaft projecting through said casing and said cover and being fixedly secured to said casing, a sleeve rotatably mounted on said drive shaft and projecting into said casing, and having a disk portion integral therewith within the casing, an internal gear in said casing, a plurality of pinions mounted on said disk and being adapted to mesh with said internal gear, a second sleeve rotatably mounted on the first sleeve and having a spur gear thereon within the casing adapted to mesh with said pinions, holes drilled at an angle from the interior of the casing through said cover to a point short of the outer edge of said hole, a plurality of spiral grooves on said sleeves and said drive shafts adapted to feed lubricant back into the casing.

In testimony whereof we affix our signatures.

WALTER C. STEWART.
EMANUEL FROHMAN.